20
United States Patent Office 2,873,267
Patented Feb. 10, 1959

2,873,267

MONOAZO DYESTUFFS AND THEIR METAL COMPLEX COMPOUNDS

Willy Steinemann, Basel, Switzerland, assignor to Sandoz A. G., Basel, Switzerland, a Swiss firm No Drawing. Application July 12, 1957
Serial No. 671,426

Claims priority, application Switzerland July 20, 1956

9 Claims. (Cl. 260—146)

The present invention relates to monoazo dyestuffs and their metal complex compounds which in the metal-free form correspond to the general formula

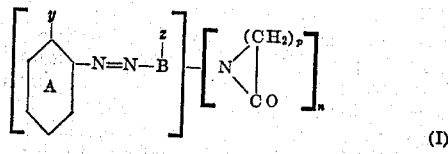

(I)

wherein B stands for the radical of an azo component of the naphthalene series coupling in the ortho-position to a hydroxy group or to a primary or secondary amino group, or for the radical of an azo component of the pyrazolone or acylacetylamino series coupling in ortho position to an enolic hydroxy group,
y for a substituent capable of metal complex formation,
z for a phenolic or enolic hydroxy group or a primary or secondary amino group in ortho-position to the —N=N— group,
n for the figure 1 or 2, and
p for the figure 3 or 4, and wherein B and the nucleus A may contain further substituents.

The process for the production of the new monoazo dyestuffs and their metal complex compounds consists in uniting 1 mol of the diazo compound of an aminobenzene containing in the ortho-position to the amino group a substituent capable of metal complex formation with 1 mol of an azo component of the naphthalene series coupling in ortho-position to a hydroxy group or to a primary or secondary amino group, or with 1 mol of an azo component of the pyrazolone or acylacetylamino series coupling in ortho-position to an enolic hydroxy group, and treating the resultant monoazo dyestuff, which must contain at least once the grouping

(II)

wherein p has one of the afore-named meanings, with a metal-yielding agent, either in substance or on the fiber.

In the diazo component the substituent y capable of metal complex formation is preferably a hydroxy, methoxy or carboxy group. Examples of the substituents which may be carried by the nucleus A as here defined are halogen atoms (chlorine, bromine), nitro, acetylamino, benzoylamino, carboxy, carbomethoxyamino, carbethoxyamino, methyl, ethyl, tert. butyl, methoxy, sulfonic acid, sulfonic acid-amide, sulfonic acid-methylamide, sulfonic acid - dimethylamide, sulfonic acid-(2'-hydroxy)-ethylamide, sulfonic acid-di-(2'-hydroxyethyl)-amide, sulfonic acid-hydroxypropylamide, sulfonic acid-methoxypropylamide, sulfonic acid-phenylamide, sulfonic acid-(2'-carboxy)-phenylamide and methylsulfonyl groups, and further a second grouping (II).

Suitable azo components coupling in ortho-position to a phenolic or enolic hydroxy group or to a primary or secondary amino group are e. g. hydroxynaphthalenes, aminonaphthalenes, alkylamino-, cycloalkylamino-, aralkylamino- and arylaminonaphthalenes, 1-aryl-3-methyl-5-pyrazolones, acylacetylaminoalkanes, acylacetylaminobenzenes and acylacetylaminonaphthalenes. These azo components may carry the same substituents as the diazo components, the preferred substituent being the grouping (II).

The diazotization of the aminobenzenes conforming to the present definition is conducted in the normal manner; the heterocyclic ring of the grouping (II) is stable to acids and lyes at room temperature.

The diazo compounds thus obtained are coupled at 0° to 10° C. with the azo component containing a phenolic or enolic hydroxy group, preferably in weakly acid to weakly alkaline or strongly alkaline medium, and if desired in the presence of pyridine. The coupling reaction with an azo component containing a primary or secondary amino group is carried out at 10° to 20° C. in a weakly acid, preferably acetic acid, medium. The resultant monoazo compounds are precipitated from the coupling mass, if necessary with salt, and then filtered off.

The monoazo dyestuffs are converted into their metal complex compounds preferably with chromium or cobalt compounds. Metallization is performed advantageously in an aqueous solution or an organic medium, for example formamide, or in the concentrated aqueous solution of an alkali metal salt of a low molecular aliphatic monocarboxylic acid. It is of advantage to proportion the quantities of dyestuff and metal-yielding agent to permit less than two but at least one atom of metal to act upon two molecules of the monoazo dyestuff.

Suitable chromium compounds are e. g. chromic fluoride, chromic sulfate, chromic formate, chromic acetate, potassium chromic sulfate and ammonium chromic sulfate. The chromates also—e. g. sodium or potassium chromate or bichromate—are eminently suitable for metallizing the monoazo dyestuffs. It is advisable here to work in a strong caustic alkaline medium, to which reducing substances may be added if desired.

Cobaltous formate, cobaltous acetate and cobaltous sulfate serve as cobalt compounds. When metallization is carried out in the concentrated aqueous solution of an alkali metal salt of a low molecular aliphatic monocarboxylic acid, water-insoluble metal compounds such as cobalt hydroxide and cobalt carbonate may be used as alternatives.

It is of particular advantage to conduct metallization in an aqueous or alkaline medium, the metal compounds being added in the presence of compounds which keep the metals dissolved in complex combination in a caustic alkaline medium. Examples of such compounds are tartaric acid, citric acid and lactic acid.

The metal complex compounds obtained in this manner are precipitated from aqueous medium by the addition of salt, the organic metallizing solution being previously run into water if desired. The precipitate is filtered, washed if desired, and dried.

The resultant metalliferous azo dyestuffs are homogeneous metal complex compounds in which essentially one atom of metal is linked to two molecules of the monoazo compound. They can be described as so-called 1:2 complexes in which one molecule of the monoazo compound is combined with approximately 0.3–0.7 of an atom of metal.

The new monoazo dyestuffs possess good building-up properties on wool, silk, leather and polyamide fibers by the afterchroming and one-bath chroming processes. They dye these fibers in red, yellow, green, blue, violet, gray and brown shades of good fastness to light, washing, milling, perspiration, sea water, alkali, acids, potting, pressing, crocking, carbonizing and decatizing.

The metalliferous azo dyestuffs draw well on wool, silk, leather and polyamide fibers from neutral or weakly acid dyebaths and yield red, yellow, green, blue, violet, gray or brown shades. These dyestuffs with sufficiently high solubility in organic solvents are also suitable for dyeing manmade fibers dissolved in organic solvents which are subsequently spun into filament and for pigmenting lacquer media and plastics of every description.

The dyeings obtained with the metalliferous azo dyestuffs are fast to light, washing, milling, perspiration, sea water, alkali, pressing, crocking, carbonizing and decatizing. The dyeings produced with the chromiferous azo dyestuffs possess in addition an excellent fastness to acids.

The following examples illustrate the invention. The parts and percentages are by weight and the temperatures are given in degrees centigrade.

Since the nomenclature of the heterocyclic rings is not uniform in the literature and the designation of chemical compounds containing heterocyclic rings is rather complicated, the heterocyclic radicals occuring in the following examples are replaced by simple symbols:

X means the radical

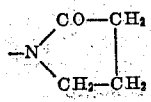

and Y means the radical

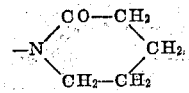

EXAMPLE 1

To 22.65 parts of 2-amino-1-hydroxy-4-chloro-6-X-benzene are added 20 parts of hydrochloric acid 30% and 180 parts of water. The mixture is cooled to 0°, then fed gradually with a solution of 6.9 parts of sodium nitrite in 30 parts of water and stirred for 20 to 30 minutes at 0–5° to complete diazotization. The diazo solution is neutralized to a pH value of 5.0–6.0 by dropwise addition of 25–30 parts of a 20% aqueous solution of sodium carbonate. It is then combined at 0–5° with a solution of 22 parts of 1-acetylamino-7-hydroxynaphthalene, 4.4 parts of sodium hydroxide, 10 parts of anhydrous sodium carbonate and 250 parts of water. The mass is stirred at 0–5° for several hours until the coupling reaction is completed. After this time the dark resultant suspension is heated to 40°, and the monoazo dyestuff completely precipitated by means of common salt, filtered off, dried and ground.

The dyestuff is obtained as a black-blue powder which dissolves in water with a blue coloration and in concentrated sulfuric acid with a Bordeaux red coloration. Applied to wool by the afterchrome or one-chrome processes, it yields blue-gray dyeings which possess excellent fastness to light, washing, milling, perspiration, crocking, potting and acids.

The dyeing procedure is as follows:

2 parts of the above-described monoazo dyestuff and 10 parts of anhydrous sodium sulfate are dissolved in 6000 parts of water at 40°. 100 parts of wool are introduced into this dyebath, which is then heated to 100° in the course of about 30 minutes. After the addition of 20 parts of acetic acid 10% dyeing is continued for 30 minutes at the boil; at this point another 20 parts of 10% formic acid are added and dyeing continued for 30 minutes at the same temperature with gradual replacement of the evaporated water. Then 1 part of sodium bichromate in 10% aqueous solution is added to the dyebath, the temperature being held at 100° for 30 minutes after this addition. The afterchromed wool dyeing is then removed from the dyebath, rinsed with water and dried. It is dyed in a level blue-grey shade of very good fastness to light, washing, milling, perspiration crocking, potting and acids.

The new diazo component used in the preparation of the monoazo dyestuff of this example is produced as follows:

The mixture of 1 mol of 1-hydroxy-4-chloro-6-aminobenzene and 1.2 mols of γ-butyrolactone is heated at 220–240° for several hours. The reaction mass is then stirred with water in order to dissolve the non reacted γ-butyrolactone, whereupon the precipitate is suctioned off and dried. The dry 1-hydroxy-4-chloro-6-X-benzene is dissolved in five times its amount of concentrated sulfuric acid and mononitrated with a nitric acid-sulfuric acid mixture by the conventional method. The 1-hydroxy-2-nitro-4-chloro-6-X-benzene thus produced is precipitated by pouring the nitration solution into ample water. It is then filtered off, washed with water and reduced to the 2-amino-1-hydroxy-4-chloro-6-X-benzene by the established Béchamp method.

EXAMPLE 2

44 parts of the monoazo dyestuff of Example 1 are dissolved in 440 parts of formamide. This solution is heated to 100–110° and over the next 30 minutes is fed gradually with 30 parts of potassium chromic sulfate, the temperature being maintained at 100–120° until formation of the chromium complex is completed. The chroming mass is then run into 1200 parts of water, following which the chromiferous azo dyestuff is salted out, filtered off and dried. Upon grinding it is obtained as a blue-black powder which dyes wool, silk, polyamide fibers and leather in blue-gray shades which show notably good fastness to light, washing, milling, perspiration, crocking and acids.

2 parts of the chromiferous azo dyestuff thus obtained are dissolved in 4000 parts of water at 40–50°. 100 parts of pre-wetted wool are entered into the solution, which is then drop-fed with 2 parts of acetic acid 100%. The dyebath is heated to the boil in the course of 30 minutes and held at this temperature for a further 45 minutes. The dyed wool is then removed, rinsed with water and dried. The dyeing thus produced shows very good fastness to light, washing, milling, perspiration, crocking and acids.

EXAMPLE 3

44 parts of the monoazo dyestuff of Example 1 are dissolved in a solution of 8 parts of sodium hydroxide in 1500 parts of water at 60°. A solution of 15 parts of cobaltous sulfate in 600 parts of water, rendered alkaline with an aqueous ammonia solution, is allowed to run into the initial solution over a period of 30 minutes. After this time the metallizing mass is held at 60° for a further 10 minutes, following which the cobalt complex compound is salted out and filtered off. When dried and ground the cobaltiferous dyestuff is a blue-black powder which dyes wool and polyamide fibers in gray shades fast to light, washing, perspiration, alkaline milling and crocking.

EXAMPLE 4

15.4 parts of 2-amino-1-hydroxy-4-nitrobenzene in a mixture of 20 parts of hydrochloric acid 30% and 100 parts of water at 5° are given a solution of 6.9 parts of sodium nitrite in 30 parts of water. The suspension is stirred at 0–5° until diazotization is completed, then carefully neutralized with 5 parts of anhydrous sodium carbonate and run gradually at 0–5° into a solution of 24.1 parts of 1-Y-7-hydroxynaphthalene, 4 parts of sodium hydroxide and 22 parts of anhydrous sodium carbonate in 250 parts of water. On completion of the coupling the resultant monoazo dyestuff is precipitated with salt, suctioned off, dried and ground. A dark powder is obtained which dissolves in water with a violet coloration and dyes wool to reddish gray shades in the one-bath chrome process.

The procedure for a dyeing of this type is as follows:

A piece of wool fabric, 100 parts by weight, is immersed in a dyebath prepared with 2 parts of the dyestuff, 10 parts of Glauber's salt, 6 parts of ammonium sulfate, 2 parts of potassium bichromate and 6000 parts of water. The bath is raised to the boil in 15 minutes and maintained at the boil for a further 90 minutes. The wool fabric, dyed to a red-brown shade, is removed, rinsed with water and dried. The dyeing shows very good fastness to washing, milling, light, perspiration, potting, crocking and acids.

EXAMPLE 5

40.6 parts of the monoazo dyestuff described in the first paragraph of Example 4 are dissolved in 1000 parts of water and 4 parts of sodium hydroxide at 90°. To the dyestuff solution are added simultaneously a solution of 9 parts of sodium bichromate and 4 parts of sodium hydroxide in 100 parts of water and a solution of 16 parts of grape sugar in 80 parts of water. This metallizing solution is maintained at 90–95° until complex formation is completed. Then the chromiferous azo dyestuff is isolated and dried. It is a dark powder which dyes wool, silk, polyamide fibers and leather in fast black shades.

EXAMPLE 6

40.6 parts of the monoazo dyestuff described in the first paragraph of Example 4 are added to a suspension at 90° composed of 400 parts of crystallized sodium acetate, 40 parts of water and 8 parts of cobalt carbonate. The suspension is heated to 100°–110° and held at this temperature for half an hour, i. e. until the initial monoazo dyestuff is no longer indicated. The suspension is then run into 500 parts of cold water. The mixture is stirred until the sodium acetate goes into solution and the cobaltiferous azo dyestuff is completely precipitated. The latter is filtered off, dried and ground. It is a dark powder which dissolves in water with a Bordeaux-red coloration and dyes wool, silk, polyamide fibers and leather in shades fast to light, washing, milling, perspiration and crocking.

The 8 parts of cobalt carbonate used in the present example can be replaced by 6.3 parts of cobalt hydroxide.

EXAMPLE 7

18.8 parts of 2-amino-1-hydroxybenzene-4-sulfonic acid-amide are dissolved in 18 parts of hydrochloric acid and 100 parts of water. The solution is cooled at 0°, then given a concentrated aqueous solution of 6.9 parts of sodium nitrite and stirred at 0–5° until diazotization is completed. The dispersion of the diazo compound is well stirred and then a solution of 30.2 parts of 2-(3'-X-phenylamino)-naphthalene in 200 parts of acetic acid 100% is added to it. The mixture is heated to 40–50° and stirred at this temperature until coupling is completed. The red monoazo dyestuff is precipitated; it is suctioned off, dissolved in dilute caustic soda, reprecipitated with sodium chloride, then suctioned off and dried.

25.2 parts of the monoazo dyestuff thus obtained are dissolved with 4 parts of sodium hydroxide in 800 parts of water. To this solution is added a solution of 7.1 parts of crystallized cobaltous sulfate, 2.8 parts of sodium hydroxide and 63 parts of a 3% tartaric acid solution. The mass is heated at 60° until no further metal-free monoazo compound is indicated. The cobalt complex compound so formed is precipitated from the solution by sodium chloride, then filtered off, dried and ground. It is a dark powder which dyes wool, silk, leather and polyamide fibers in gray-violet shades.

EXAMPLE 8

The red monoazo compound of Example 7 can be converted into the chromium complex compound according to the specifications of Example 2. This compound is a dark powder yielding gray shades on wool, silk, leather and polyamide fibers.

EXAMPLE 9

20.2 parts of 2-amino-1-hydroxybenzene-4-sulfonic acid-methylamide are diazotized in a mixture of 20 parts of hydrochloric acid 30% and 100 parts of water at 0–5° with a solution of 6.9 parts of sodium nitrite and 30 parts of water. The diazo suspension at 0–5° is united with a solution of 24.8 parts of 1-Y-7-hydroxynaphthalene, 4 parts of sodium hydroxide, 20 parts of sodium carbonate and 250 parts of water. The mass is stirred for several hours at 0–5°. After this time the coupling reaction is completed. Precipitation of the dyestuff, already partial, is accomplished by acidifying the solution. The precipitate is suctioned off, washed and dried. Upon grinding it is obtained as a dark powder which dissolves in water with a violet coloration and in concentrated sulfuric acid with a Bordeaux-red coloration. It is applicable to wool by the afterchrome and one-bath chrome processes, and in both instances gives reddish gray shades which exhibit very good fastness to light, washing, milling, perspiration, potting, crocking and acids.

In order to convert the monoazo dyestuff into the cobalt complex compound 45.6 parts of it are dissolved in 30 parts of a 30% sodium hydroxide solution and 1000 parts of water at 90°. This solution is drop-fed with 80 parts of a hot 20% cobaltous sulfate solution, following which the cobaltiferous azo dyestuff is precipitated, filtered off and dried. The product is ground to give a violet powder which dyes wool, silk and polyamide fibers in violet shades of very good all-round fastness.

In the following table further monoazo dyestuffs and metal-containing azo dyestuffs are enumerated. They can be obtained according to the particulars given in Examples 1 to 9. In the table they are characterized by the diazo and azo components (columns (I) and (II)), by the use to which they may be put (column (III)) and by the shade of the metallized dyeings on wool (column (IV)). The abbreviations in column (III) stand for:

Afterchr.=afterchroming dyestuff,
Cr-C=chromium complex compound,
Co-C=cobalt complex compound,

Table

| Example No. | Diazo Component (I) | Azo Component (II) | Use (III) | Shade of the Metal Complex Compound on Wool or in Spun-Dyed Fibers (IV) |
|---|---|---|---|---|
| 10 | 2-Amino-1-hydroxy-4-X-6-nitrobenzene | 1-Hydroxy-2-acetylamino-4-methylbenzene | Cr-C | brown. |
| 11 | do | Acetoacetylaminobenzene | Cr-C | yellow. |
| 12 | do | 2-Methylaminonaphthalene | Co-C | gray. |
| 13 | 2-Amino-1-hydroxy-4-X-benzene-6-sulfonic acid. | 2-Phenylaminonaphthalene | Afterchr. | Do. |
| 14 | do | 2-Hydroxynaphthalene-4-sulfonic acid | Afterchr. | blue. |
| 15 | do | 1-Phenyl-3-methyl-5-pyrazolone-3'-sulfonic acid-methylamide. | Afterchr. | red. |
| 16 | 2-Amino-1-hydroxy-4-Y-benzene-6-sulfonic acid. | 1-Acetoacetylamino-benzene-3-sulfonic acid-amide. | Afterchr. | yellow. |
| 17 | 2-Amino-1-hydroxy-4-X-6-chlorobenzene. | 2-Hydroxynaphthalene | Cr-C | gray. |
| 18 | do | 1-Hydroxy-4-tert. butylbenzene | Afterchr. | brown. |
| 19 | 2-Amino-1-hydroxy-4-methyl-6-Y-benzene. | 1-Hydroxy-4-methoxynaphthalene | Cr-C | blue. |
| 20 | 2-Amino-1-hydroxy-4-methylsulfonyl-6-X-benzene. | 1-Acetoacetylamino-2-ethylhexane | Cr-C | orange. |
| 21 | do | 1-[Naphthyl-(2')]-3-methyl-5-pyrazolone-6'-sulfonic acid. | Afterchr. | red. |
| 22 | 2-Amino-1-hydroxy-4-nitro-6-Y-benzene | do | Afterchr. | Do. |
| 23 | 2-Amino-1-hydroxy-4-Y-6-nitrobenzene | 2-Hydroxynaphthalene | Cr-C | blue. |
| 24 | 2-Amino-1-hydroxy-4-X-benzene | do | Cr-C | blue-gray. |
| 25 | do | 1-Carbomethoxyamino-7-hydroxynaphthalene. | Cr-C | Do. |
| 26 | do | 2-Hydroxynaphthalene-3.6-disulfonic acid. | Afterchr. | blue-red. |
| 27 | do | 1-(3'-Cyano)-phenyl-3-methyl-5-pyrazolone. | Co-C | red. |
| 28 | do | 1-Phenyl-3-methyl-5-pyrazolone-3'-sulfonic acid-amide. | Co-C | Do. |
| 29 | 2-Amino-1-hydroxy-4-X-6-acetylaminobenzene. | 2-Hydroxynaphthalene | Cr-C | blue-red. |
| 30 | 2-Amino-1-hydroxy-4-X-benzene-6-sulfonic acid-amide. | 1-Acetoacetylaminobenzene-4-sulfonic acid-phenylamide. | Co-C | reddish yellow. |
| 31 | 2-Amino-1-hydroxy-4-Y-benzene-6-sulfonic acid-methylamide. | 2-Hydroxynaphthalene-6-sulfonic acid | Afterchr. | blue. |
| 32 | 2-Amino-1-hydroxy-4-X-benzene-6-sulfonic acid-(2'-hydroxy)-ethylamide. | 1-(2',3'-Tetramethylene)-phenyl-3-methyl-5-pyrazolone-4'-sulfonic acid-amide. | Cr-C | red. |
| 33 | 2-Amino-1-hydroxy-4-X-benzene-6-sulfonic acid-dimethylamide. | 2-Hydroxynaphthalene-6-sulfonic acid-(3'-methoxy)-propylamide. | Co-C | Bordeaux. |
| 34 | 2-Amino-1-hydroxy-4-Y-benzene-6-sulfonic acid-phenylamide. | 1-Acetoacetylamino-2-methoxybenzene | Cr-C | reddish yellow. |
| 35 | do | 1-Acetoacetylamino-naphthalene-4-sulfonic acid-ethylamide. | Cr-C | yellow-red. |
| 36 | 2-Amino-1-hydroxy-6-X-benzene-4-sulfonic acid-phenylamide. | 1-(4'-X)-Phenyl-3-methyl-5-pyrazolone | Cr-C | red. |
| 37 | do | 2-Hydroxynaphthalene | Cr-C | blue-red. |
| 38 | 2-Amino-1-hydroxy-4-chloro-6-Y-benzene. | 1-Hydroxynaphthalene-4-sulfonic acid | Afterchr. | blue. |
| 39 | 2-Amino-1-hydroxy-4-nitrobenzene | 1-X-7-Hydroxynaphthalene | Cr-C | black. |
| 40 | do | do | Co-C | Bordeaux-red. |
| 41 | 2-Amino-1-hydroxy-4-X-6-nitrobenzene | do | Co-C | gray. |
| 42 | do | 1-Amino-4-Y-naphthalene | Cr-C | Do. |
| 43 | 2-Amino-1-hydroxy-4-Y-6-nitrobenzene | 1-Acetoacetylamino-4-X-benzene | Cr-C | reddish yellow. |
| 44 | 2-Amino-1-hydroxy-4-nitro-6-X-benzene | 1-(3'-X)-Phenyl-3-methyl-5-pyrazolone | Co-C | red. |
| 45 | do | 1-X-7-Hydroxynaphthalene | Cr-C | gray. |
| 46 | do | 1-Y-7-Hydroxynaphthalene-3-sulfonic acid-amide. | Cr-C | Do. |
| 47 | do | 1-Acetylamino-7-hydroxynaphthalene | Cr-C | blue. |
| 48 | 2-Amino-1-hydroxy-4-X-benzene-6-sulfonic acid-(2'-hydroxy)-propylamide. | 1-Hydroxy-5.8-dichloronaphthalene | Cr-C | Do. |
| 49 | 2-Amino-1-hydroxy-4-X-benzene-6-sulfonic acid-morpholide. | 2-Hydroxy-6-bromonaphthalene | Afterchr. | Do. |
| 50 | 2-Amino-1-hydroxy-O.O-3.4-dimethyl-6-X-benzene. | 2-Hydroxynaphthalene-6-sulfonic acid | Co-C | reddish yellow. |
| 51 | 2-Amino-1-hydroxy-4-X-benzene-6-sulfonic acid-di-(2'-hydroxy-ethyl)-amide. | 1-Acetoacetylamino-1.1.3.3-tetramethylbutane. | Afterchr. | red. |
| 52 | 2-Amino-1-hydroxy-4-Y-benzene-6-sulfonic acid-methylamide. | 3-Methyl-5-pyrazolone | Co-C | gray. |
| 53 | 2-Amino-1-hydroxy-4-tert. butyl-6-X-benzene. | 1-Acetylamino-7-hydroxynaphthalene | Co-C | Bordeaux. |
| 54 | 2-Amino-1-hydroxy-4-X-benzene | 1-Hydroxy-5-carbomethoxyaminonaphthalene. | Cr-C | red. |
| 55 | 2-Amino-1-hydroxy-4.6-dichlorobenzene | 1-(4'-X)-Phenyl-3-methyl-5-pyrazolone | Cr-C | Do. |
| 56 | 2-Amino-1-hydroxy-4-chloro-6-nitrobenzene. | 1-(3'-X)-Phenyl-3-methyl-5-pyrazolone | Co-C | Do. |
| 57 | do | do | Cr-C | black. |
| 58 | 2-Amino-1-hydroxy-4-nitro-6-chlorobenzene. | 1-X-7-Hydroxynaphthalene | Cr-C | reddish gray. |
| 59 | 2-Amino-1-hydroxy-4-chlorobenzene | do | Cr-C | blue-gray. |
| 60 | 2-Amino-1-hydroxy-4-chloro-5-nitrobenzene. | do | Co-C | violet. |
| 61 | 2-Amino-1-hydroxy-4-methylsulfonylbenzene. | do | Cr-C | reddish gray. |
| 62 | do | do | Cr-C | Do. |
| 63 | 2-Amino-1-hydroxybenzene-4-sulfonic acid-phenylamide. | do | Cr-C | black. |
| 64 | 2-Amino-1-hydroxy-4-nitro-6-acetylaminobenzene. | do | Co-C | gray. |
| 65 | do | 1-X-7-Hydroxynaphthalene-3-sulfonic acid-methylamide. | Cr-C | blue-gray. |
| 66 | 2-Amino-1-hydroxy-4-methyl-6-acetylbenzene. | do | Cr-C | Do. |
| 67 | 2-Amino-1-hydroxy-4-chloro-6-acetylbenzene. | do | Cr-C | gray. |
| 68 | 2-Amino-1-hydroxybenzene-4-sulfonic acid-cyclohexylamide. | do | Cr-C | |

Table—Continued

| Example No. | Diazo Component (I) | Azo Component (II) | Use (III) | Shade of the Metal Complex Compound on Wool or in Spun-Dyed Fibers (IV) |
|---|---|---|---|---|
| 69 | 2 - Amino - 1 - hydroxybenzene - 4 - sulfonic acid-benzylamide. | 1 - X - 7 - Hydroxynaphthalene - 3 - sulfonic acid-amide. | Cr-C | gray. |
| 70 | 2-Amino-1-hydroxy-3.4.6-trichlorobenzene. | ----do---- | Co-C | Do. |
| 71 | 2 - Amino - 1 - hydroxybenzene - 4 - sulfonicacid-(2'-dimethylaminosulfonyl)-phenylamide. | 1-X-7-Hydroxynaphthalene | Cr-C | reddish gray. |
| 72 | 2 - Amino - 1 - hydroxybenzene - 4 - sulfonic acid-diethylamide. | ----do---- | Cr-C | Do. |
| 73 | 2 - Amino - 1 - hydroxybenzene - 4 - sulfonic acid-isopropylamide. | 1-X-7-Hydroxynaphthalene | Cr-C | Do. |
| 74 | 2 - Amino - 1 - hydroxybenzene - 4 - sulfonic acid-(3'-methoxy)-propyl-amide. | ----do---- | Cr-C | Do. |
| 75 | 2 - Amino - 1 - hydroxybenzene - 4 - sulfonic acid-(2'-hydroxy)-ethyl-amide. | ----do---- | Cr-C | Do. |
| 76 | 2-Amino-1-hydroxy-4-acetylbenzene | ----do---- | Co-C | gray. |
| 77 | 2-Amino-1-hydroxybenzene-4-sulfonic acid. | ----do---- | Afterchr. | reddish gray. |
| 78 | 2 - Amino - 1 - methoxybenzene - 4 - sulfonic acid-amide. | 1-Y-7-Hydroxynaphthalene | Cr-C | Do. |
| 79 | ----do---- | ----do---- | Co-C | violet. |
| 80 | 2 - Amino - 1 - hydroxy - 4 - nitrobenzene - 6-sulfonic acid-dimethyl-amide. | ----do---- | Cr-C | black. |
| 81 | 2 - Amino - 1 - methoxybenzene - 4 - sulfonic acid-pyrrolidide. | 1-(4'-X)-Phenyl-3-methyl-5-pyrazolone | Cr-C | red. |
| 82 | 2-Amino-1-hydroxybenzene-5-sulfonic acid. | ----do---- | Afterchr. | blue-red. |
| 83 | 2-Amino-1-hydroxy-6-nitrobenzene-4-sulfonic acid-amide. | 1-X-7-Hydroxynaphthalene | Cr-C | gray. |
| 84 | 2-Amino-1-hydroxy-benzene-4-sulfonic acid-morpholide. | ----do---- | Co-C | violet. |
| 85 | 2-Amino-1-carboxybenzene-5-sulfonic acid-phenylamide. | ----do---- | Cr-C | red-brown. |
| 86 | 2-Aminobenzene-1-carboxylic acid | ----do---- | Afterchr. | Do. |
| 87 | 2-Amino-1-hydroxy-4-methyl-6-nitrobenzene. | ----do---- | Co-C | gray. |
| 88 | 2-Amino-1-hydroxybenzene-4-sulfonic acid-methylamide. | 1 - X - 7 - Hydroxynaphthalene - 3 - sulfonic acid. | Afterchr. | reddish gray. |
| 89 | ----do---- | 2-(4'-X)-Phenyl-aminonaphthalene | Co-C | gray-violet. |
| 90 | 2-Amino-5-X-benzene-1-carboxylic acid | 1-Hydroxy-4-methylbenzene | Cr-C | reddish yellow. |
| 91 | ----do---- | 1-Phenyl-3-methyl-5-pyrazolone | Cr-C | Do. |
| 92 | ----do---- | 1-Acetylamino-7-hydroxynaphthalene | Cr-C | brown. |
| 93 | ----do---- | Acetoacetylaminobenzene | Cr-C | yellow. |
| 94 | 2-Amino-5-Y-benzene-1-carboxylic acid | 1 - Hydroxy - 2 - acetylamino - 4 - methylbenzene. | Cr-C | brown. |
| 95 | ----do---- | 2-Hydroxynaphthalene | Cr-C | red-brown. |
| 96 | ----do---- | 1-(4'-X)-Phenyl-3-methyl-5-pyrazolone-2'-sulfonic acid. | Afterchr. | reddish yellow. |
| 97 | 2-Amino-1-hydroxy-4-nitrobenzene | 1-(4'-X)-Phenyl-3-methyl-5-pyrazolone-2'-sulfonic acid-amide. | Co-C | brownish yellow. |

Formulae of representative dyestuffs of the foregoing Examples are

Example 1

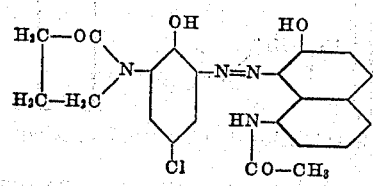

Example 2

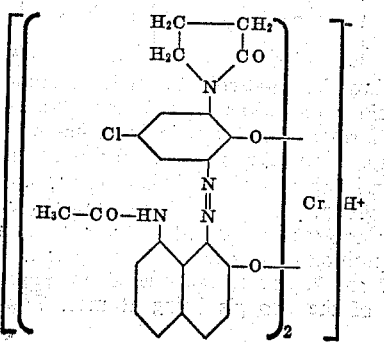

Example 3

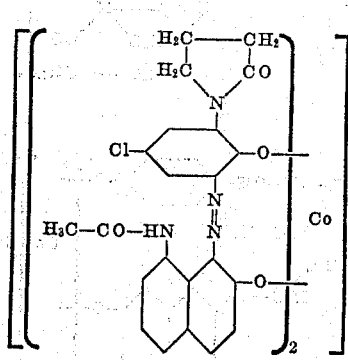

Example 4

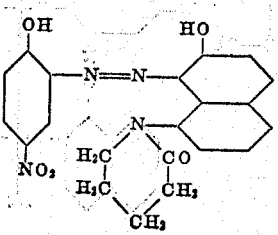

Example 5

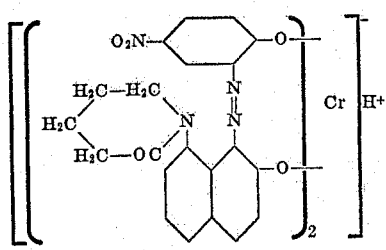

Example 6

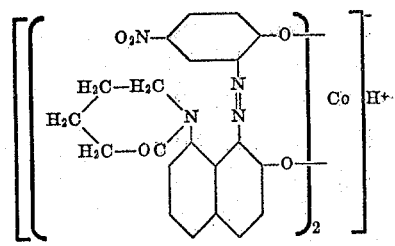

Example 7

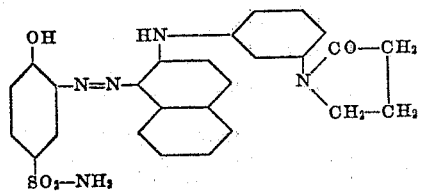

Example 8

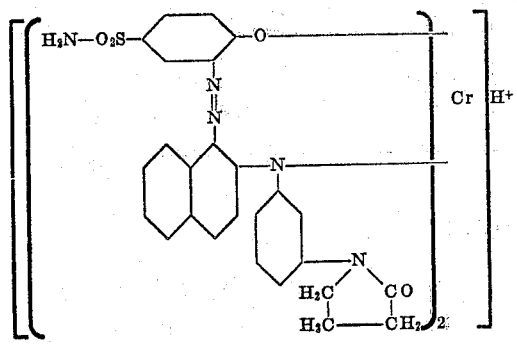

Example 9

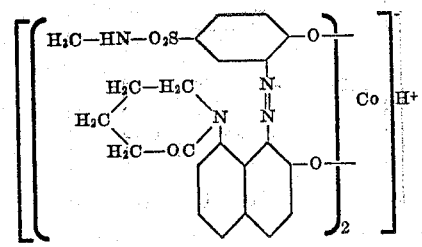

Example 24

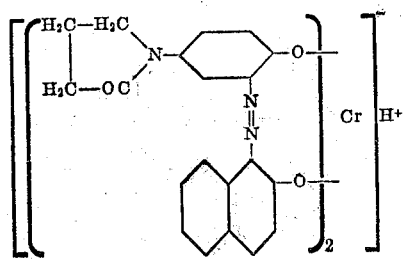

Example 25

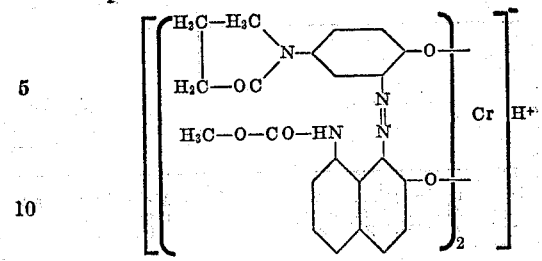

Example 28

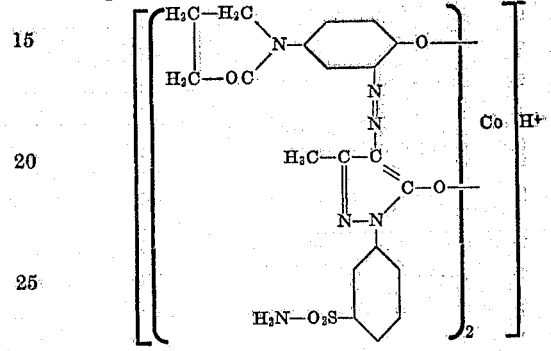

Example 39

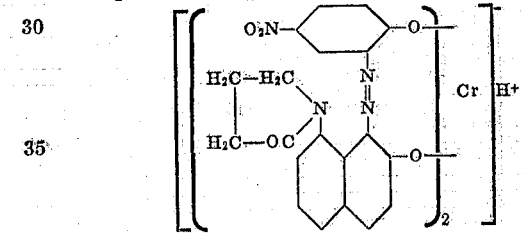

Example 56

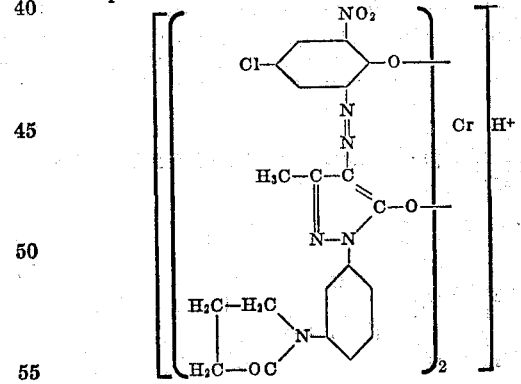

Having thus disclosed the invention, what is claimed is:

1. A member selected from the group consisting of monoazo dyestuffs of the general formula

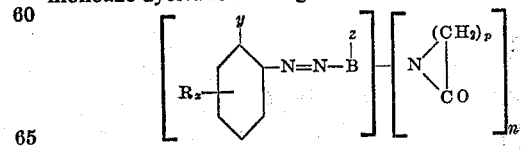

and the chromium and cobalt complex compounds thereof, wherein $y$ represents a substituent capable of metal complex formation and stands in ortho-position to the azo group, $z$ represents a member selected from the group consisting of a phenolic hydroxy group, an enolic hydroxy group, an unsubstituted amino group and a methylamino group and a phenylamino group and stands in ortho-position to the azo group, $n$ represents one of the integers 1 and 2, $p$ represents one of the integers 3 and 4, the sum of the two $p$'s being at most 7 when $n=2$, wherein R represents a member selected from the group consisting of H, chloro, nitro, lower alkyl, acetyl, acetylamino, sulfo, sulfonic acid amide, sulfonic acid lower alkylamide, sulfonic acid di-lower alkylamide, sulfonic acid lower hydroxyalkylamide, sulfonic acid di-(lower hydroxyalkyl)-amide, sulfonic acid lower alkoxyalkylamide, sulfonic acid mononuclear arylamide, sulfonic acid cyclohexylamide, sulfonic acid benzylamide, sulfonic acid morpholide, sulfonic acid pyrrolidide, and methylsulfonyl radicals, B represents the radical of a coupling component coupling in ortho-position to the substituent z and selected from the group consisting of a hydroxynaphthalene, an aminonaphthalene, a methylaminonaphthalene, a phenylaminonaphthalene, an acetoacetylaminooctane, an acetoacetylaminobenzene, an acetoacetylaminonaphthalene, a 1-phenyl-3-methyl-5-pyrazolone and a 1-naphthyl-3-methyl-5-pyrazolone.

2. A member selected from the group consisting of monoazo dyestuffs of the general formula

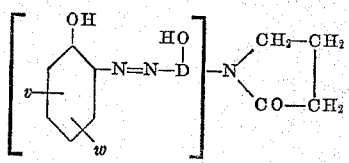

and the chromium and cobalt complex compounds thereof wherein D represents a hydroxynaphthalene coupling in ortho position to the hydroxy group, $v$ represents a member selected from the group consisting of a hydrogen atom, a nitro group and an acetylamino group, and $w$ represents a member selected from the group consisting of a hydrogen atom, a chlorine atom and a nitro group.

3. The chromium complex dyestuff which corresponds to the formula

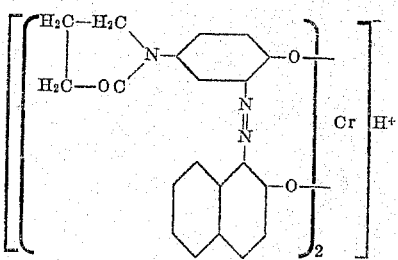

4. The chromium complex dyestuff which corresponds to the formula

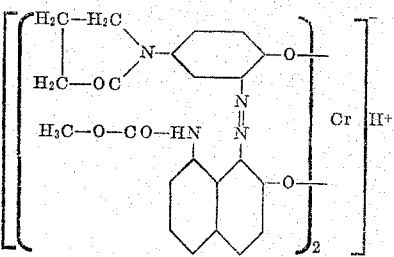

5. The cobalt complex dyestuff which corresponds to the formula

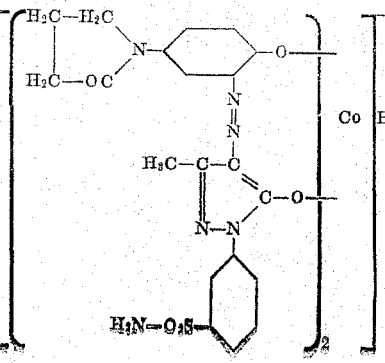

6. The chromium complex dyestuff which corresponds to the formula

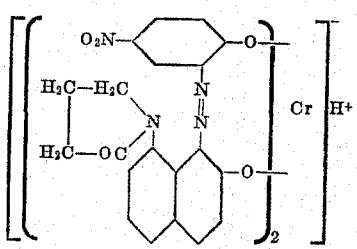

7. The chromium complex dyestuff which corresponds to the formula

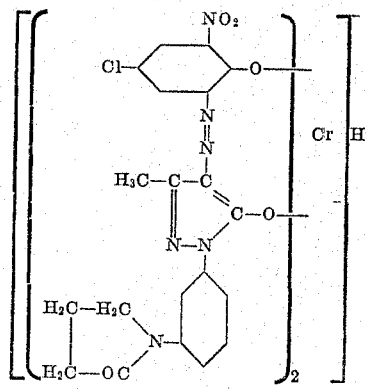

8. The chromium complex dyestuff which corresponds to the formula

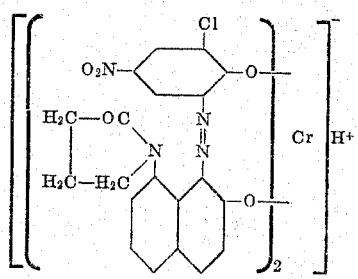

9. The chromium complex dyestuff which corresponds to the formula

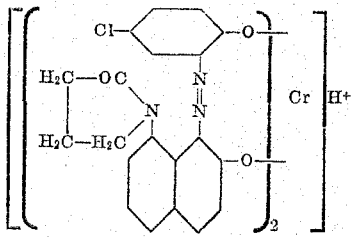

References Cited in the file of this patent
UNITED STATES PATENTS

| | | |
|---|---|---|
| 2,269,218 | McNally et al. | Jan. 6, 1942 |
| 2,804,455 | Dorlars et al. | Aug. 27, 1957 |